4,508,938

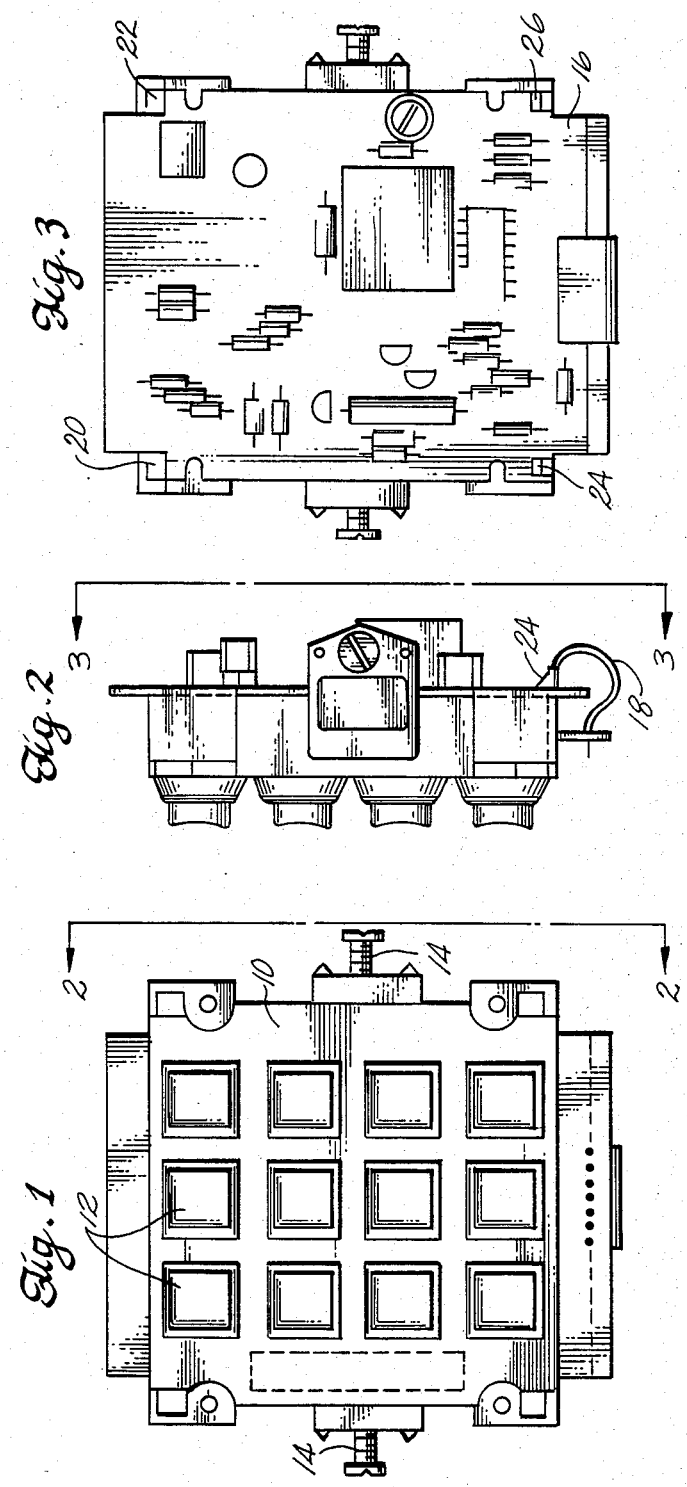

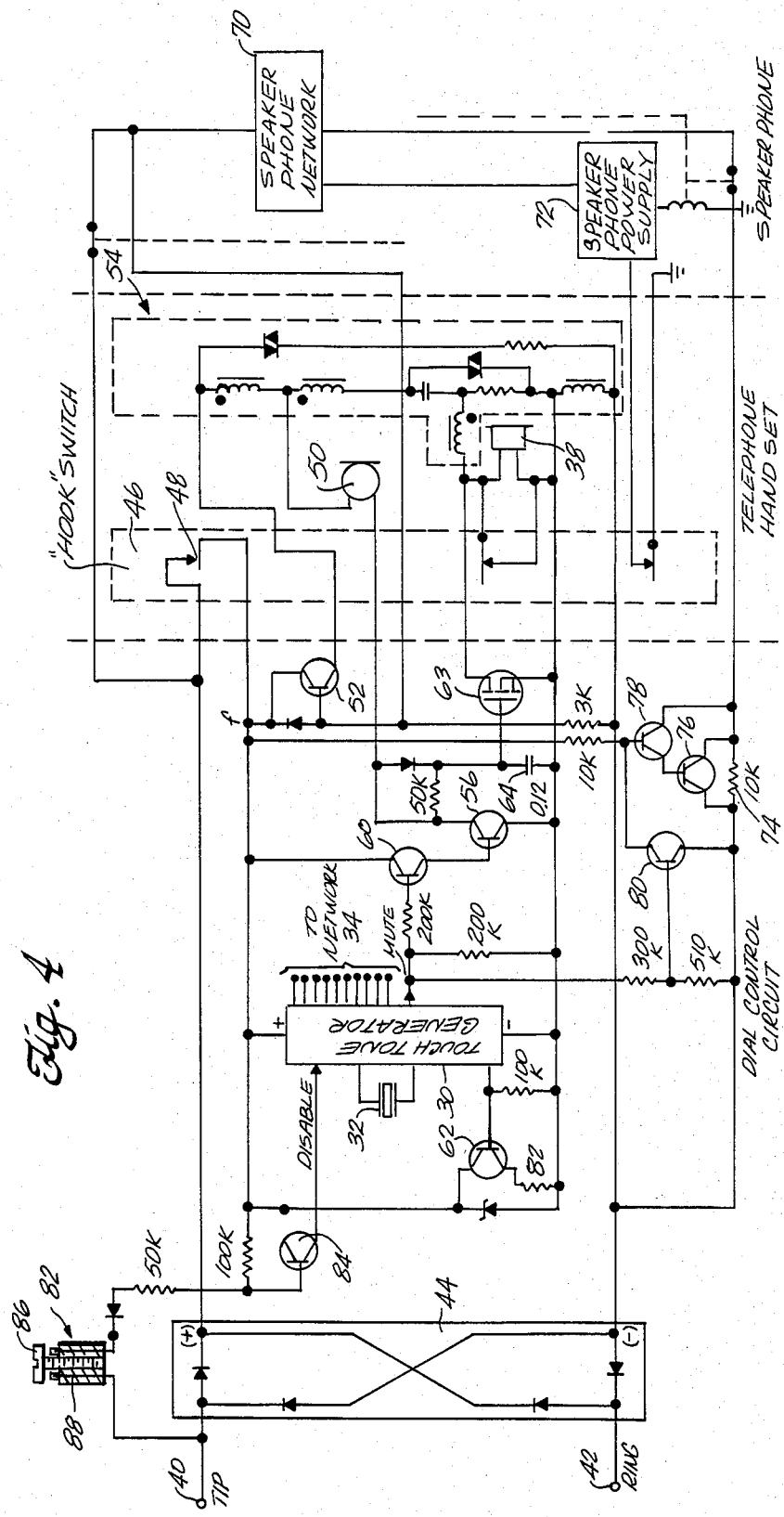

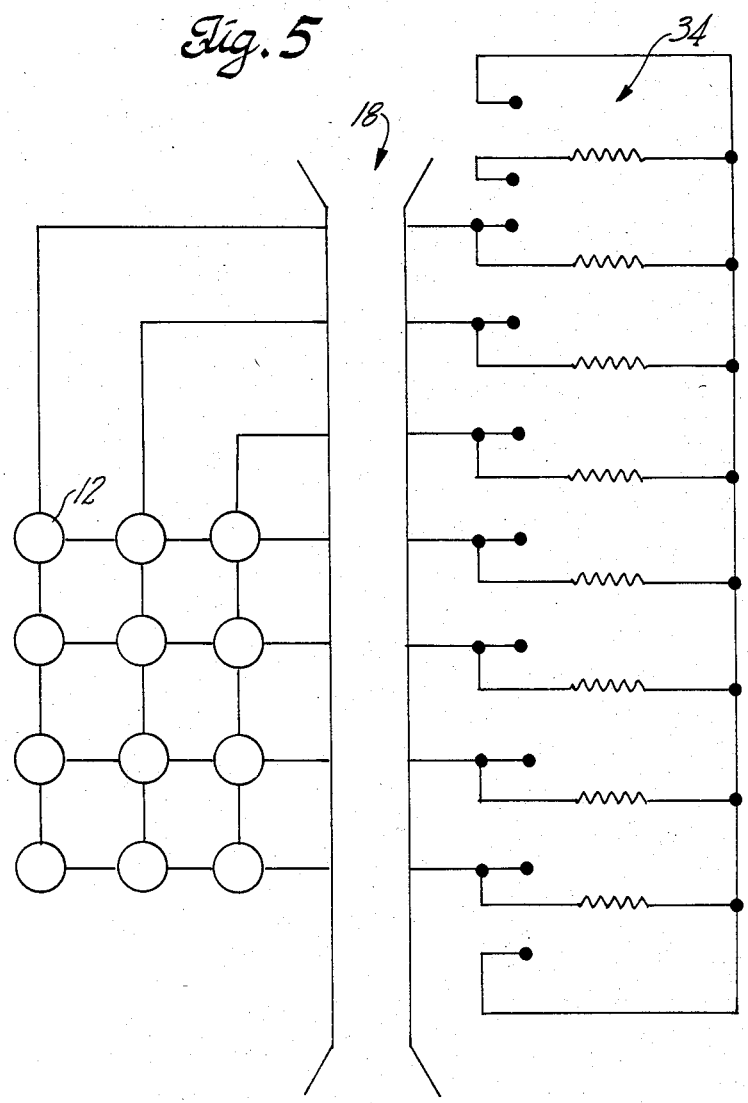

PUSH-BUTTON DIAL FOR A TELEPHONE

FIELD OF THE INVENTION

This invention relates to push-button dial phones and, more particularly, to a solid state switching circuit for operating a touch-tone dial phone.

BACKGROUND OF THE INVENTION

In the past, push-button dials in telephones have used a mechanical key pad with sequential metallic switching to perform state transformations. When operating the push-button dial, the operation of any key on the dialing pad operated a plurality of metallic contacts in sequence as the button was depressed. The first set of contacts to be closed inserted a resistor in series with the receiver to mute the receiver. This was followed by the operation of a second set of metallic contacts which opened the transmitter path to limit outside noise interference. Full depression of the key finally closed a set of contacts for inserting the dial tone circuit into the line to produce the dial tone signal associated with the key. The reverse sequence occured when a key on the key pad is released. When operating in the speaker phone mode, a metallic set of contacts is required to removed the shunting effect of the hybrid network and provide a speech path to the speaker phone. When a push-button is depressed, a set of metallic contacts inserted a resistor to mute the audio signals and an additional set of metallic contacts inserted the dial tone generating circuit. Such push-button dials are expensive and difficult to manufacture in large numbers while maintaining the required quality. The contacts must be arranged to carefully control the sequence in which the multiple sets of contacts open and close.

SUMMARY OF THE INVENTION

The present invention is directed to an improved push-button dial system for a telephone which utilizes a simple push-button assembly requiring a single set of contacts for each push-button while other switching requirements of the push-button dial circuit are provided by solid state switches. Thus the new push-button dial assembly provides longer life, is less expensive to manufacture, and offers greater reliability and lower cost.

DESCRIPTION OF THE DRAWINGS

For a better understanding of the invention, reference should be made to the accompanying drawings, wherein:

FIG. 1 is a top view of the push-button dial assembly;
FIG. 2 is an end view of the push-button dial assembly;
FIG. 3 is a bottom view of the push-button dial assembly;
FIG. 4 is a schematic wiring diagram of the push-button dial control circuit; and
FIG. 5 is a schematic wiring diagram of the key pad.

DETAILED DESCRIPTION

Referring to FIGS. 1, 2 and 3 in detail, the numeral 10 indicates generally a push-button key pad having ten push-button keys 12 arranged in a 3 by 4 matrix which is common to touch-tone dial telephones. Each key, when depressed, closes a single pole switch. The key pad is preferably constructed in a manner described in more detail in U.S. Pat. No. 4,291,201. The key pad assembly is mounted in the telephone in conventional manner by mounting screws 14. The key pad assembly is connected to a printed circuit board 16 by a flat cable connector 18, preferably having seven conductors, corresponding to the total number of columns and rows in the switch matrix. The circuit board 16 is removably mounted on the key pad assembly 10 by inserting the corners of the circuit board 16 in notches at the corners of the key pad assembly, as indicated at 20 and 22. The other corners of the circuit board 16 are held by a pair of latches 24 and 26. The latches can be pushed to one side so as to release the corners of the circuit board 16, allowing the circuit board to be shifted laterally out of the notches 20 and 22.

Referring to the key pad circuit diagram of FIG. 5, the push-buttons 12 are arranged to complete a connection at any of the crossover points of a 3 by 4 matrix of conductors. The seven row and column conductors of the matrix are connected by the seven conductors of the ribbon cable 18 to seven pins on the touch-tone generator integrated circuit chip, indicated at 30 in FIG. 4. This is a standard chip for generating a plurality of touch-tone frequencies at a tone output terminal, using the output of a quartz crystal oscillator 32. A resistor network, indicated generally at 34, acts as pull ups and pull downs on the key board input when the tone generator chip is disabled. The network has no effect on the dial in normal operation.

Referring to FIG. 4, the touch-tone control circuit for a telephone set is shown. The incoming telephone line pair is connected to the tip and ring terminals 40 and 42. A bridge rectifier circuit 44 is connected in the incoming line circuit to operate the control circuit with either polarity across the incoming line. A hook switch 46, shown in the "on-hook" condition for the telephone, connects the tip terminal through the normally open contacts 48 to a hand set transmitter 50 through a normally conducting transistor 52 and a standard hybrid network 54 when the hand set is taken off the hook. The ring terminal 42 in turn is connected to the transmitter 50 through a transistor 56 and the hybrid network 54. A receiver 58 is also normally connected to the tip and ring terminals 40 and 42 through the hybrid network 54 when the hand set is taken off the hook.

When one of the buttons 12 on the key pad is operated during a touch-tone dialing sequence, the touch-tone generator chip 30 provides a muting signal on the MUTE output terminal which is coupled through a transistor 60 to the transistor 56, turning off the transistor 56 and opening the circuit to the transmitter 50. Thus the transmission path is turned off whenever a touch-tone signal is being generated. The touch-tone signal from the generator 30 is at the same time coupled to the telephone line through the tip and ring terminals 40 and 42 through a transistor 62 and hook switch terminals 48. At the same time, the receiver 58 is muted by a transistor 63 which provides a shunting path across the receiver 58 when the transistor 56 is turned off. A capacitor 64 holds the transistor 63 on until after the transmitter path is turned on again by the transistor 56 on release of the push-button dial button.

The hand set operation, as thus far described, allows line current to be fed through the bridge rectifier 44 to power the tone generator chip 30, the transmitter 50 and the receiver 58 when the hand set is off the hook. Incoming voice signals flow through the diode bridge rectifier 44 and through the transistor 52 to the receiver

United States Patent [19]

Lawson et al.

[11] Patent Number: 4,508,939

[45] Date of Patent: Apr. 2, 1985

[54] LAST NUMBER REDIAL DEVICE

[75] Inventors: Robert Lawson; Jimmie R. Augustus; Robert Corless, all of San Jose; John Kardash, Gilroy, all of Calif.

[73] Assignee: Comdial Technology Corporation, Sunnyvale, Calif.

[21] Appl. No.: 513,871

[22] Filed: Jul. 14, 1983

[51] Int. Cl.³ .......................................... H04M 1/272
[52] U.S. Cl. .................................................... 179/90 B
[58] Field of Search ........... 179/90 B, 90 BB, 90 BD, 179/90 K, 5 R, 18 B, 84 R

[56] References Cited

U.S. PATENT DOCUMENTS 4,143,243  3/1979  Sutton ............................... 179/90 B
4,324,954  4/1982  Taylor ............................... 179/90 B Primary Examiner—Stafford D. Schreyer
Attorney, Agent, or Firm—Townsend and Townsend

[57] ABSTRACT

A last number redial device which provides a valid dialing sequence/access code test, before the contents of a last number redial register are disturbed, is described. A first and a second register are alternately loaded with a first, threshold portion (N) of a telephone number (N+M) during a dialing sequence. The number of digits entered are counted. If the count is greater than a threshold amount (N+1), a toggle signal is produced indicating a valid number has been entered. A second, terminal portion of the telephone number produced during the dialing sequence is thereafter loaded to a third register. In this way, the entire number is loaded in the selected first or second register and the third register. If a last number redial sequence is initiated, the selected one of the first or second registers and the third register provide an output to the telephone line of the last dialed number. If a next dialing sequence is initiated, the other of the first or second registers is initially loaded with the threshold portion of the telephone number. If an invalid number or access code is detected, the contents of the registers storing the last number dialed are saved. If a valid number is detected, the terminal portion of the presently dialed number is stored in the third register and the presently selected one of the first and second registers and the third register become the last number redial register.

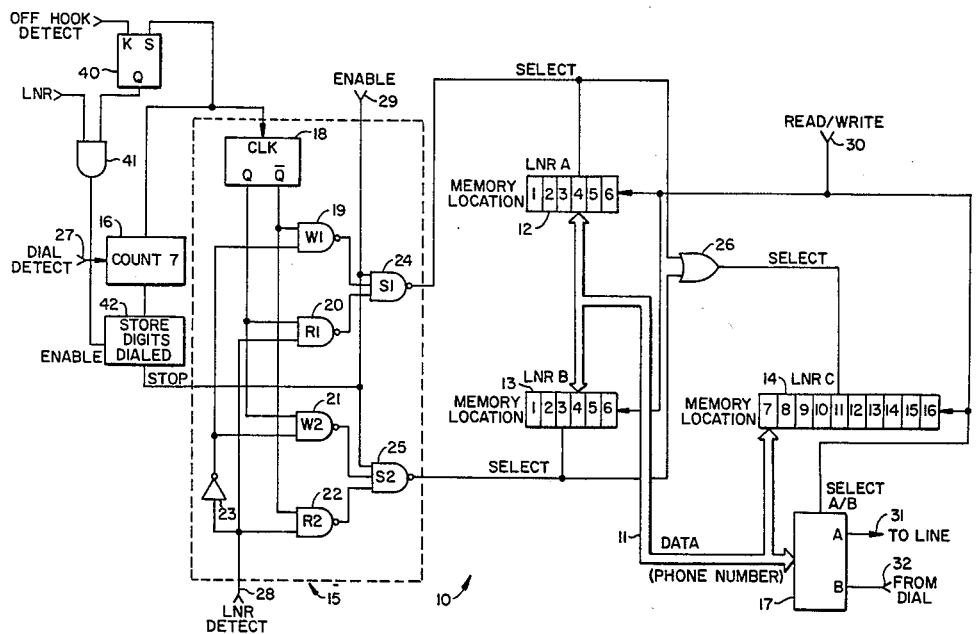

17 Claims, 2 Drawing Figures